United States Patent Office 3,361,699
Patented Jan. 2, 1968

3,361,699
LAMINATED GLAZING UNIT AND METHOD
FOR PRODUCING SAME
Paul T. Mattimoe, Toledo, and Theodore J. Motter, Genoa, Ohio, assignors to Libbey-Owens-Ford Glass Company, Toledo, Ohio, a corporation of Ohio
No Drawing. Filed Feb. 25, 1965, Ser. No. 435,788
14 Claims. (Cl. 260—31.4)

This invention relates generally to improvements in laminated glazing units, and more particularly is concerned with a novel interlayer composition for use in the production of laminated safety glass and to its method of manufacture.

Laminated safety glass, as employed in the windshields of modern automobiles, is comprised of two sheets of glass integrally bonded together through an interposed layer of plastic. Almost universally the plastic interlayer material employed is polyvinyl butyral. Polyvinyl butyral is an elastomeric material which can absorb the energy of an impacting object by undergoing elongation to a degree which is dependent to a considerable extent on the adhesive forces acting between such polyvinyl butyral and the glass. If the adhesion of a plastic interlayer to the glass is maintained at a high level, then the ability of the interlayer to elongate and absorb the energy of an impacting object will be reduced with a consequent decrease in resistance to penetration. On the other hand, if little or no adhesion exists between the interlayer and the glass, then resistance to penetration will be near a maximum. However, as will be readily appreciated, the condition of little or no adhesion cannot be tolerated in automotive safety glass because of the danger to occupants from pieces of flying glass which could become detached from the interlayer when the laminate is broken, and accordingly, it has been the universal practice to maintain the adhesion of the polyvinyl butyral to glass at a high level. This use of high adhesion polyvinyl butyral has further been influenced to no small extent by the fact that no acceptable methods for adjusting the adhesion have heretofore been available.

It has now been found, however, that there is an optimum level of glass to interlayer adhesion in laminated glass for automobile windshields. At this optimum level of adhesion, the interlayer would be permitted to elongate sufficiently to provide good resistance to penetration by blunt objects, such as the human head, while at the same time sufficient adhesion would exist to prevent the detachment of glass particles of any appreciable size.

Up to the present time, the methods available for adjusting or controlling the adhesion of polyvinyl butyral to glass all suffer from serious disadvantages. For example, it has been proposed to accomplish this end by regulating the moisture content of the vinyl butyral interlayer. It has long been known that vinyl butyral plastic of the type used in laminated glass shows a decreased adhesion to glass at higher moisture contents. This plasic can absorb up to 4 to 5 percent water. However, it is ordinarily laminated at a moisture content of between 0.3 and 0.8 percent. By exposing the plastic to high humidities, its moisture content can be increased and it has accordingly been proposed to adjust the moisture content to about 1 percent before laminating as a means of establishing a reduced level of adhesion at which the interlayer will be able to elongate appreciably on impact but not so low that glass particles of a substantial size will become detached.

However, this high moisture approach is difficult to follow in large scale commercial manufacture of windshields because it requires that the laminating operations be carried out under conditions of very high humidity, otherwise the plastic will lose moisture to the surrounding atmosphere during assembly of the windshield. Moreover, laminated glass made with a high moisture content interlayer has been found to be less stable to heat and less durable to weather exposure than laminated glass having an interlayer of lower moisture content. Still further, the control over adhesion obtained by laminating with high moisture content interlayers is not consistently reproducible. Apparently, different lots of the interlayer material react differently to high moisture content with a resulting variable effect on adhesion.

It has now been discovered, and the instant invention is based upon such discovery, that the adhesion of glass to a vinyl butyral plastic can be controlled reproducibly throughout the normal range of interlayer moisture content presently used in the safety glass industry by the addition to the vinyl butyral resin compositions of certain organic, non-ionic, oil dispersible surface active compounds containing hydrophilic and hydrophobic groups in the same molecule. This discovery has enabled the production of novel laminated glazing units possessing an optimum level of glass to interlayer adhesion.

It is, therefore, a principal object of the present invention to provide an improved laminated glazing unit.

Another object of the invention is the provision of a novel interlayer composition for use in the manufacture of laminated safety glass.

It is another object of the invention to provide a novel method for treating a vinyl butyral resin to improve its adaptability for use as an interlayer material.

It is a further object of the invention to provide a vinyl butyral plastic sheeting which, when employed as the interlayer material in a laminated glass unit, imparts thereto a greatly improved combination of glass adhesion and resistance to impact penetration properties.

Another object of the invention is the provision of a method of treating polyvinyl butyral resins to control the adhesion thereof to glass without simultaneously sacrificing other desirable properties of the resins.

It is a still further object of the invention to provide a method of the above character wherein the control over the adhesive property of the resins is reproducible.

Other objects and advantages will in part be apparent and will in part appear hereinafter.

For a better understanding of the nature and objects of the invention, reference should be had to the following detailed description which is intended only to illustrate and disclose, but in no way limit, the invention.

In accordance with one aspect of the invention a process of treating polyvinyl butyral resins to improve their over-all adaptability for use in laminated glazing units is provided. Such process briefly comprises admixing, with 100 parts by weight of polyvinyl butyral resin, from 30 to 50 parts by weight of a plasticizer, and from about 0.5 to 15 parts by weight of a compound having the general structural formula:

$$X-Y_m-Z_n$$

wherein X is a member of the group consisting of fatty acid, fatty amide and fatty ether radicals which contain from 10 to 18 carbon atoms and no more than one double bond, Y is a polyhydroxyl radical derived from a compound selected from the group consisting of sorbitan, glycerol, ethylene glycol and propylene glycol with $m$ having a value of from 0 to 1, and Z is a hydroxyl terminated polyoxyethyl group having from 1 to 20 oxyethyl groups with $n$ having a value of from 0 to 2 but in all events having a value greater than 0 when $m$ equals 0. The addition of a compound having the above recited general structural formula to a polyvinyl butyral resin composition has been found to reduce to a moderate extent the adhesion to glass of the interlayer formed there-from while substantially increasing the resistance to penetration of laminates produced with such interlayer. Also, and most importantly, this improved combination of properties may be easily reproduced on a production basis by following the teachings of the present invention, minor differences in the properties and/or composition of the resin to be treated notwithstanding.

The polyvinyl butyral resins to be treated in accordance with the present invention may be formed either by (1) producing polyvinyl alcohol from polyvinyl acetate through the action of an acid or an alkaline catalyst and then converting by reaction with butyraldehyde to an acetal through the action of an acid catalyst, or (2) conducting the reactions in a single stage with an acid catalyst, both as are well known in the art. These polyvinyl butyral resins generally contain about 16 to 25 percent hydroxyl groups by weight, calculated as polyvinyl alcohol, less than 3 percent acetate groups, calculated as polyvinyl acetate, and the balance, about 72 to 84 percent by weight polyvinyl butyral.

In addition, the polyvinyl butyral resins treated in accordance with the invention may also have been neutralized. In this connection, the residual acid catalyst in the resin-forming solution is neutralized by the addition thereto of a suitable alkali or alkaline salt. The quantity of the alkaline salt is generally slightly in excess of that required to neutralize the mineral acid catalyst with the resulting resin having an alkalinity or alkaline titer of from about 10 to 30. These neutralized resins, it may be added, are those presently substantially universally commercially employed in the production of safety glass interlayers.

Now, in accordance with the present invention, 100 parts by weight of the above described polyvinyl butyral resins are compounded with 0.5 to 15 parts by weight of a compound having the hereinbefore recited general structural formula. Some preferred compounds are polyoxyethylene sorbitan monopalmitate, polyoxyethylene sorbitan monostearate and polyoxyethylene sorbitan monooleate. With reference to the general structural formula, X of course represents the fatty acid groups of these compounds, Y the sorbitan group and Z the polyoxyethylene chain. Both $n$ and $m$ have values of one in these compounds. Another compound which has been found to provide excellent results in accordance with the invention is diethylene glycol monoricinoleate. As will be readily appreciated with regard to this compound, X represents the ricinoleyl radical and Z the polyoxyethyl group with $n$ equaling one and $m$ equaling zero. Two further compounds which may be employed in accordance with the invention are glycerol monoricinoleate and sorbitan monolaurate. With reference to the general structural formula, X represents the ricinoleyl radical and Y the glycerol with $m$ equaling one and $n$ equaling zero for the former compound and X represents the monolaurate radical and Y the sorbitan with $m$ equaling one and $n$ equaling zero with regard to the latter compound. Two polyoxyethylene glycol esters of fatty acids currently marketed under the tradenames "Ethofat 60/25," a polyoxyethylene glycol ester of stearic acid and "Ethofat 242/25," a polyoxyethylene glycol ester of 70% rosin fatty acids have also been found effective for use in accordance with the invention in controlling the adhesion of polyvinyl butyral in safety glass as well as ethylene oxide condensates of fatty acid amides, such as "Ethomid 0/15," the chemical designation of which is polyoxyethylene oleyl amide, and "Ethomid HT/60" which is described as the polyoxyethylated derivative of hydrogenated tallow fatty acid amides by the Armour Industrial Chemical Company.

Many other oil dispersible surface active materials in accordance with the generic structural formula have also been found to function to control the adhesion of a polyvinyl butyral safety glass interlayer, among which may be mentioned: alkyl aryl polyether alcohol, glycerol oleostearate, sorbitan monolaurate, polyoxyethylene sorbitol laurate, alkyl polyoxyethylene thioether, polyethanolamine condensate of fatty acid (marketed under the tradename "Cerfak N-100" by the E. F. Houghton and Co.), nonylphenoxypolyoxyethylene ethanol and a polyoxyethylated fatty alcohol marketed under the tradename "Emulphor ON-870" by Antara Chemicals.

The preferred range of parts of adhesion controlling compound in accordance with the invention per 100 parts of polyvinyl butyral resin is dependent to some extent upon the compound itself. Thus, it has been found that with certain of the compounds a relatively small amount, e.g. 0.5 to 7 parts by weight thereof, per 100 parts by weight of resin is all that is necessary to produce the desired controlled adhesion, and in some instances greater amounts tend to reduce the adhesion below a preferred level. For example, the addition of 0.5 to 1 part by weight of diethylene glycol monoricinoleate to 100 parts by weight of polyvinyl butyral resin and 39 to 40 parts by weight of plasticizer results in a particularly excellent controlled adhesion interlayer material. Similarly, the addition of 2 to 5 parts by weight of polyoxyethylene sorbitan monopalmitate to 100 parts by weight of resin and 35 to 38 parts by weight of plasticizer, and 3 to 7 parts by weight of either "Emulphor ON-870" or nonylphenoxypolyoxyethylene ethanol per 100 parts by weight of resin and 33 to 37 parts by weight of plasticizer results in a particularly excellent controlled adhesion interlayer material.

On the other hand, certain of the adhesion controlling compounds in accordance with the invention produce their most desirable effect on the adhesive properties of the polyvinyl butyral resin when present in relatively large amounts, e.g. over 7 parts by weight thereof per 100 parts by weight of resin. For example, particularly excellent results have been obtained with the addition of 7 to 10 parts by weight of either glycerol monoricinoleate or polyoxyethylene sorbitan monolaurate to 100 parts by weight of resin and 30 to 33 parts by weight of plasticizer.

As previously mentioned, either before or after admixing a compound in accordance with the invention with the polyvinyl butyral resin, such resin is normally compounded with a suitable plasticizer. Generally, to be effective in laminated glass over a wide variety of weather conditions, the resins are plasticized with from 30 to 50 parts by weight of plasticizer per 100 parts by weight of resin. The plasticizers most generally used in the laminated glass industry are dibutyl sebacate, triethylene glycol di-2-ethylbutyrate and dibutyl Cellosolve adipate. Other ester plasticizers may be used where special effects are desired. After thorough homogenization of the resin, plasticizer and additive compound in accordance with the invention, the admixture is formed into a sheet of predetermined thickness to fashion a laminate of the strength desired. Thereafter the resin sheets are assembled with glass sheets and laminated under heat and pressure to produce the finished glazing unit.

The following examples are given in illustration and are not intended as limitations on the scope of this invention. Where parts and percents are mentioned, they are parts and percents by weight unless otherwise indicated.

*Example I*

A polyvinyl butyral resin manufactured by condensing butyraldehyde with polyvinyl alcohol in the presence of a mineral acid catalyst was prepared. As previously mentioned, the technique of manufacturing resins of this type is well known to those skilled in the art whereby it is not believed necessary to describe this process here in detail. Suffice to say that the polyvinyl butyral resin was the product of such a condensation reaction carried out under conditions of time, temperature and concentration of reactants to yield a product having a chemical composition comprised of 75 percent to 82 percent of condensed butyraldehyde groups and 18 percent to 25 percent polyvinyl alcohol groups in the resin chain. The residual acid catalyst in the resin-forming solution was neutralized with an alkaline material as is also well known in the art.

To produce an interlayer sheeting having a controlled adhesion in accordance with the invention, the neutralized polyvinyl butyral resin was milled on a rubber-type malaxating mill with 3GH plasticizer (triethylene glycol di-2-ethylbutyrate) and polyoxyethylene sorbitan monopalmitate (marketed under the tradename "Tween 40") as the adhesion controlling agent. The formulation was made up of 100 parts by weight of resin, 35 parts by weight of 3GH and 5 parts by weight polyoxyethylene sorbitan monopalmitate. This admixture was then sheeted on a mill to a thickness of 0.015 inch.

The resulting polyvinyl butyral sheet was laminated with two outer plies of ⅛ inch thick plate glass 12 inches by 12 inches in size. This laminate was clear, colorless and heat stable and showed no ill effects after six months' exposure to the elements in Arizona and a 1000 hour accelerated weathering test in which the laminate was continually subjected to the light of a carbon arc rich in ultra violet rays and intermittently sprayed with water.

Additional 12 inch by 12 inch laminates produced in exactly the same manner as described above were then impacted with a two pound steel ball free falling vertically from a height of 10 feet. In every case the laminate supported the steel ball. The plastic pulled loose or let go from the glass along fractures for a distatnce of up to ⅛ inch indicating reduced adhesion and high energy absorption. Only a small number of fine particles of glass separated from the surfaces of the laminates. The adhesion of the glass to the plastic interlayer was then additionally tested by subjecting it to the hammer crush test which is a conventional test for adhesion throughout the laminated glass industry. This test generally comprises subjecting a laminate to a temperature of zero degrees F. for about one hour. The thus conditioned laminate is then held against a heavy metal plate and hammered until the glass is completely pulverized with no flat glass surface remaining. Loose glass particles are removed by shaking the lamination and the laminates are then inspected and graded.

The adhesion is graded on an arbitrary scale of "good+" to "no bond" corresponding to the amount of bare plastic seen after the crush test. The following table sets forth the arbitrary scale against the corresponding percent of approximate area of exposed interlayer.

TABLE I

| Grading: | Percent exposed interlayer |
| --- | --- |
| Good+ | 1 or less |
| Good | 1 to 5 |
| Good— | 5 to 10 |
| Fair to Good | 10 to 30 |
| Fair | 30 to 50 |
| Poor to Fair | 50 to 70 |
| Poor | 70 to 95 |
| No Bond | 95 to 100 |

The adhesion of the glass to the plastic interlayer above described and produced in accordance with the invention as rated by this test was "good—."

For purposes of comparison, similar control laminates of identical construction as those described above except that 40 parts by weight of 3GH plasticizer was employed and none of the adhesion controlling agent was added, all failed to support the two pound steel ball when dropped from a height of 10 feet, and allowed the laminate to break in three to four pieces. No plastic let go from the glass along the fracture lines and the adhesion as determined by the hammer crush test at zero degrees F. was rated "good+."

It should be noted that the range of adhesion as determined by the above test found to produce the desired results in accordance with the invention is generally from "good—" to "poor to fair," with the preferred range being from "fair" to "good—." In present day laminates for use in automotive vehicles, it is considered essential that an adhesion of "good+" be obtained.

Example II

Neutralized polyvinyl butyral resins having the same composition as that described in Example I were formulated and 100 parts thereof compounded, in the first instance, with 39 parts of 3GH plasticizer and 1 part of diethylene glycol monoricinoleate, and in the second instance, with 39.5 parts of 3GH plasticizer and 0.5 part of diethylene glycol monoricinoleate. The resulting masses were then milled into plastic sheets 0.015 inch in thickness and these sheets laminated with two outer plies of ⅛ inch thick plate glass 12 inches by 12 inches in size to produce a clear, colorless sandwich. The laminates showed no ill effects after six months' exposure to the elements in Arizona and subjection to the accelerated weathering test previously described for 1000 hours.

Additional 12 inch square laminates produced in exactly the same manner as described above were then impacted with a two pound steel ball free falling vertically from a height of 10 feet. In every case the laminate supported the steel ball. The plastic let go from the glass along fracture lines for a distance of about ⅛ inch indicating reduced adhesion and a high energy absorption. The adhesion of the glass to the plastic interlayer, as rated by the hammer crush test at zero degrees F., was "fair to good" for the laminate with the interlayer containing 1 part of diethylene glycol monoricinoleate and "good—" for the laminate with the interlayer containing 0.5 part of this compound.

Control laminates of identical construction as those described above except that no diethylene glycol monoricinoleate was employed in the resin composition behaved exactly as the control laminates in Example I.

Example III

A mixture of 100 parts of a neutralized polyvinyl butyral resin having the same composition as that described in Example I was compounded with 35 parts of 3GH plasticizer and 5 parts of "Emulphor ON–870." This interlayer material was then sheeted in a mill to a thickness of 0.015 inch and laminated with two outer plies of ⅛ inch plate glass. The resulting laminates were clear, colorless and heat stable and satisfactorily withstood the weathering tests previously described. The laminates showed the same controlled adhesion properties when subjected to the two pound steel ball drop test as outlined in Example I. The adhesion of the glass to the plastic interlayer, as rated by the hammer crush test at zero degrees F., was "fair to good."

Examples IV and V

Neutralized polyvinyl butyral resins having essentially the same composition as that described in Example I were prepared and 100 parts thereof were compounded with 30 parts of 3GH plasticizer and, in a first instance with 10 parts of glycerol monoricinoleate, and in a second instance with 10 parts of polyoxyethylene sorbitan monolaurate (marketed under the tradename "Tween 20"). Both of the resulting compositions were sheeted into 0.015 inch interlayer and laminated with two outer plies of ⅛ inch thick plate glass. The resulting laminates showed the same controlled adhesion properties when subjected to the drop test set forth in Example I as did the laminate of that example, and the adhesion of the laminates, as rated by the hammer crush test at zero degrees F., was "fair to good" for the laminate having the glycerol monoricinoleate-containing interlayer and "fair" for the laminate having the "Tween 20"-containing interlayer.

Examples VI through X

A series of laminates, including two outer plies of ⅛ inch thick plate glass and a 0.015 inch thick interlayer, were constructed, several of which each had the interlayer composition as set forth in the following Table II.

All of the laminates were clear, colorless and heat stable and satisfactorily withstood the weathering tests described in Example I. The results of the two pound steel ball impact test and the hammer crush test at zero degrees F. for each of the laminates are also set forth in Table II.

TABLE II

| Interlayer Composition of Laminate | Results of Two Pound Steel Ball Drop Test From 10 Feet | Adhesion of Interlayer as Rated by the Hammer Crush Test at 0° F. |
|---|---|---|
| (1) 100 parts of polyvinyl butyral resin;* 37.5 parts of 3GH plasticizer; 2.5 parts of "Tween 40". | Laminate supported the steel ball. Some plastic pulled loose from the glass for a distance along fractures; however, in no instance was this distance greater than 1/8 inch. | Fair to Good. |
| (2) 100 parts of polyvinyl butyral resin; 35 parts of 3GH plasticizer; 5 parts of polyoxyethylene sorbitan mono-oleate ("Tween 80"). | _____do_____ | Good. |
| (3) 100 parts of polyvinyl butyral resin; 35 parts of 3GH plasticizer; 5 parts of "Ethomid 0/15". | _____do_____ | Fair. |
| (4) 100 parts of polyvinyl butyral resin; 35 parts of 3GH plasticizer; 5 parts of "Ethofat 242/25". | _____do_____ | Do. |
| (5) 100 parts of polyvinyl butyral resin; 30 parts of 3GH plasticizer; 10 parts of nonylphenoxypolyoxyethylene ethanol. | _____do_____ | Fair to Good. |

*All of the polyvinyl butyral resins employed in the compositions of this table had essentially the same composition as that described in Example I.

While what has been described is considered to be the most advantageous embodiments of the invention, it will be apparent that modifications and variations can be made in the compositions and specific procedures discussed without departing from the spirit and scope of the present invention, as those skilled in the art will readily understand. Such modifications and variations are considered to be within the purview and scope of the invention as defined by the appended claims.

We claim:
1. A vinyl butyral resin composition comprising 100 parts by weight of polyvinyl butyral resin, 30 to 50 parts by weight of a plasticizer for said resin selected from the group consisting of dibutyl sebacate, triethylene glycol di-2-ethylbutyrate and dibutyl Cellosolve adipate, and 0.5 to 15 parts by weight of a compound having the general structural formula:

$$X-Y_m-Z_n$$

wherein X is a member of the group consisting of fatty acid, fatty amide and fatty ether radicals which contain from 10 to 18 carbon atoms and no more than one double bond, Y is a polyhydroxyl radical derived from a compound selected from the group consisting of sorbitan, glycerol, ethylene glycol and propylene glycol with $m$ having a value of from 0 to 1, and Z is a hydroxyl terminated polyoxyethyl group having from 1 to 20 oxyethyl groups with $n$ having a value of from 0 to 2 but in all events having a value greater than 0 when $m$ equals 0.

2. A composition of matter as claimed in claim 1, wherein said compound is diethylene glycol monoricinoleate.

3. A composition of matter as claimed in claim 1, wherein said compound is polyoxyethylene sorbitan monopalmitate.

4. A composition of matter as claimed in claim 1, wherein said compound is glycerol monoricinoleate.

5. A composition of matter as claimed in claim 1, wherein said compound is a polyoxyethylated fatty alcohol.

6. A composition of matter consisting essentially of 100 parts by weight of polyvinyl butyral resin, 39 to 40 parts by weight of a plasticizer for said resin, and 0.5 to 1 part by weight of diethylene glycol monoricinoleate.

7. A composition of matter consisting essentially of 100 parts by weight of polyvinyl butyral resin, 35 to 38 parts by weight of a plasticizer for said resin, and 2 to 5 parts by weight of polyoxyethylene sorbitan monopalmitate.

8. A composition of matter consisting essentially of 100 parts by weight of polyvinyl butyral resin, 33 to 37 parts by weight of a plasticizer for said resin, and 3 to 7 parts by weight of a polyoxyethylated fatty alcohol.

9. A composition of matter consisting essentially of 100 parts by weight of polyvinyl butyral resin, 33 to 37 parts by weight of a plasticizer for said resin, and 3 to 7 parts by weight of nonylphenoxypolyoxyethylene ethanol.

10. A composition of matter consisting essentially of 100 parts by weight of polyvinyl butyral resin, 30 to 33 parts by weight of a plasticizer for said resin, and 7 to 10 parts by weight of glycerol monoricinoleate.

11. A composition of matter consisting essentially of 100 parts by weight of polyvinyl butyral resin, 30 to 33 parts by weight of a plasticizer for said resin, and 7 to 10 parts by weight of polyoxyethylene sorbitan monolaurate.

12. A laminated glass unit comprising a plurality of sheets of glass, each sheet of glass being separated from every adjacent glass sheet and adhesively bonded thereto by a sheet of polyvinyl butyral resin consisting essentially of 100 parts by weight of polyvinyl butyral, 30 to 50 parts by weight of a plasticizer for said polyvinyl butyral selected from the group consisting of dibutyl sebacate, triethylene glycol di-2-ethylbutyrate and dibutyl Cellosolve adipate and .5 to 15 parts by weight of a compound having the general structural formula:

$$X-Y_m-Z_n$$

wherein X is a member of the group consisting of fatty acid, fatty amide and fatty ether radicals which contain from 10 to 18 carbon atoms and no more than one double bond, Y is a polyhydroxyl radical derived from a compound selected from the group consisting of sorbitan, glycerol, ethylene glycol and propylene glycol with $m$ having a value of from 0 to 1, and Z is a hydroxyl terminated polyoxyethyl group having from 1 to 20 oxyethyl group with $n$ having a value of from 0 to 2 but in all events having a value greater than 0 when $m$ equals 0.

13. A method of treating a polyvinyl butyral resin for use as an interlayer material in a laminated glass unit, comprising admixing 100 parts by weight of said resin with 30 to 50 parts by weight of a plasticizer for said resin selected from the group consisting of dibutyl sebacate, triethylene glycol di-2-ethylbutyrate and dibutyl Cellosolve adipate and .5 to 15 parts by weight of a compound having the general structural formula:

$$X-Y_m-Z_n$$

wherein X is a member of the group consisting of fatty acid, fatty amide and fatty ether radicals which contain from 10 to 18 carbon atoms and no more than one double bond, Y is a polyhydroxyl radical derived from a compound selected from the group consisting of sorbitan, glycerol, ethylene glycol and propylene glycol with $m$ having a value of from 0 to 1, and Z is a hydroxyl terminated polyoxyethyl group having from 1 to 20 oxyethyl groups with $n$ having a value of from 0 to 2 but in all events having a value greater than 0 when $m$ equals 0.

14. An interlayer for use in the manufacture of laminated glazing units, comprising a sheet of polyvinyl butyral resin consisting essentially of 100 parts by weight of polyvinyl butyral, 30 to 50 parts by weight of a plasticizer for said polyvinyl butyral selected from the group consisting of dibutyl sebacate, triethylene glycol di-2-ethylbutyrate and dibutyl Cellosolve adipate and .5 to 15 parts by weight of a compound having the general structural formula:

$$X-Y_m-Z_n$$

wherein X is a member of the group consisting of fatty acid, fatty amide and fatty ether radicals which contain from 10 to 18 carbon atoms and no more than one double bond, Y is a polyhydroxyl radical derived from a compound selected from the group consisting of sorbitan, glycerol, ethylene glycol and propylene glycol with $m$ having a value of from 0 to 1, and Z is a hydroxyl terminated polyoxyethyl group having from 1 to 20 oxyethyl groups with $n$ having a value of from 0 to 2 but in all events having a value greater than 0 when $m$ equals 0.

References Cited

UNITED STATES PATENTS

| 2,380,925 | 8/1945 | Cheyney | 260—32.6 |
| 2,433,097 | 12/1947 | Debacher | 260—31.6 |
| 2,453,570 | 11/1948 | Debacher | 260—31.6 |

MORRIS LIEBMAN, *Primary Examiner.*

L. T. JACOBS, *Assistant Examiner.*

UNITED STATES PATENT OFFICE
CERTIFICATE OF CORRECTION

Patent No. 3,361,699                                         January 2, 1968

Paul T. Mattimoe et al.

It is hereby certified that error appears in the above numbered patent requiring correction and that the said Letters Patent should read as corrected below.

Column 7, TABLE II, third column, line 2 thereof, for "Good." read -- Good- --.

Signed and sealed this 11th day of February 1969.

(SEAL)
Attest:

Edward M. Fletcher, Jr.                                      EDWARD J. BRENNER
Attesting Officer                                              Commissioner of Patents